United States Patent
Bruhwiler

(10) Patent No.: US 6,750,558 B1
(45) Date of Patent: Jun. 15, 2004

(54) APPARATUS FOR GENERATING ELECTRICAL ENERGY

(76) Inventor: Othmar Bruhwiler, Santisstrasse 2, 9524 Zuzwil (CH)

( * ) Notice: Subject to any disclaimer, the term of this patent is extended or adjusted under 35 U.S.C. 154(b) by 0 days.

(21) Appl. No.: 10/019,234
(22) PCT Filed: May 19, 2000
(86) PCT No.: PCT/CH00/00279
  § 371 (c)(1), (2), (4) Date: Apr. 2, 2002
(87) PCT Pub. No.: WO01/03274
  PCT Pub. Date: Jan. 11, 2001

(30) Foreign Application Priority Data

Jun. 29, 1999 (CH) .............................................. 1202/99

(51) Int. Cl.⁷ ................................................ F03D 9/00
(52) U.S. Cl. .......................................... 290/55; 362/35
(58) Field of Search .............................. 290/55; 362/35

(56) References Cited

U.S. PATENT DOCUMENTS

| | | | | |
|---|---|---|---|---|
| 1,560,535 A | * | 11/1925 | Burton | 188/155 |
| 2,619,527 A | * | 11/1952 | Gray | 340/949 |
| 4,191,988 A | * | 3/1980 | Kumakura | 362/473 |
| 4,298,910 A | * | 11/1981 | Price | 362/35 |
| 4,782,431 A | * | 11/1988 | Park | 362/161 |
| 4,805,329 A | * | 2/1989 | Tsai | 40/550 |
| 5,552,972 A | * | 9/1996 | Rezvani | 362/500 |
| 5,580,093 A | * | 12/1996 | Conway | 280/816 |
| 5,718,499 A | * | 2/1998 | De Caro | 362/464 |
| 5,873,600 A | * | 2/1999 | Conway | 280/816 |

FOREIGN PATENT DOCUMENTS

| | | | |
|---|---|---|---|
| DE | 27 10 146 | 9/1978 | |
| JP | 59 127566 | 7/1984 | |
| KR | 2001096698 A | * 11/2001 | ........... F04D/25/08 |

OTHER PUBLICATIONS

Lueger et al., "*Lexicon der Technik*", 1965, vol. 7, pp. 578–581.

* cited by examiner

Primary Examiner—Joseph Waks
(74) Attorney, Agent, or Firm—Morgan, Lewis & Bockius LLP

(57) ABSTRACT

An apparatus with generation of electrical energy, including a rotor with at least one coil; a stator with at least one magnet and at least one electrical consumer located on the rotor and connected to the at least one coil, wherein the at least one consumer includes at least one of a light-emitting element and a nonluminous signal transmitter, and wherein the light-emitting element includes at least two light-emitting diodes connected in series to one another.

9 Claims, 3 Drawing Sheets

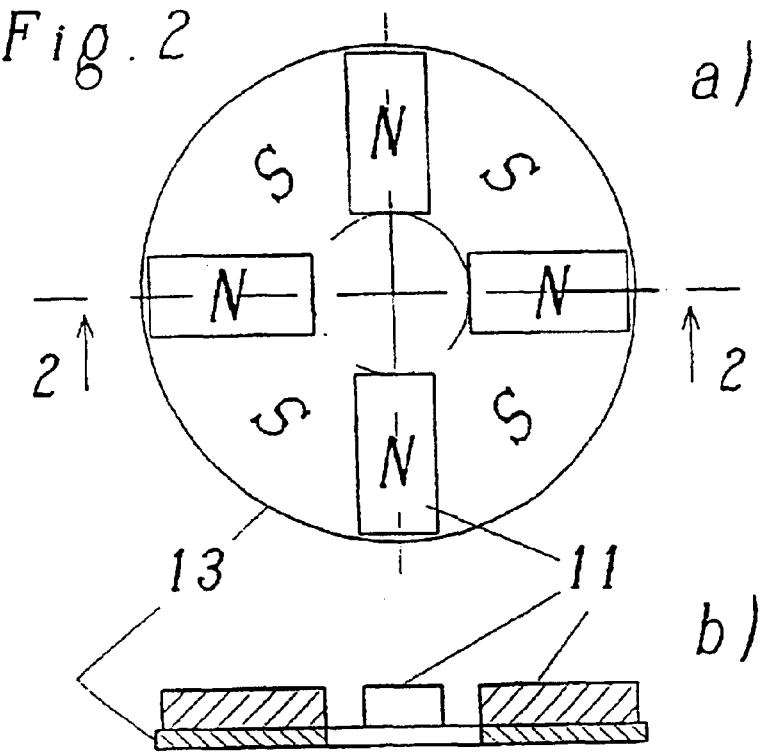
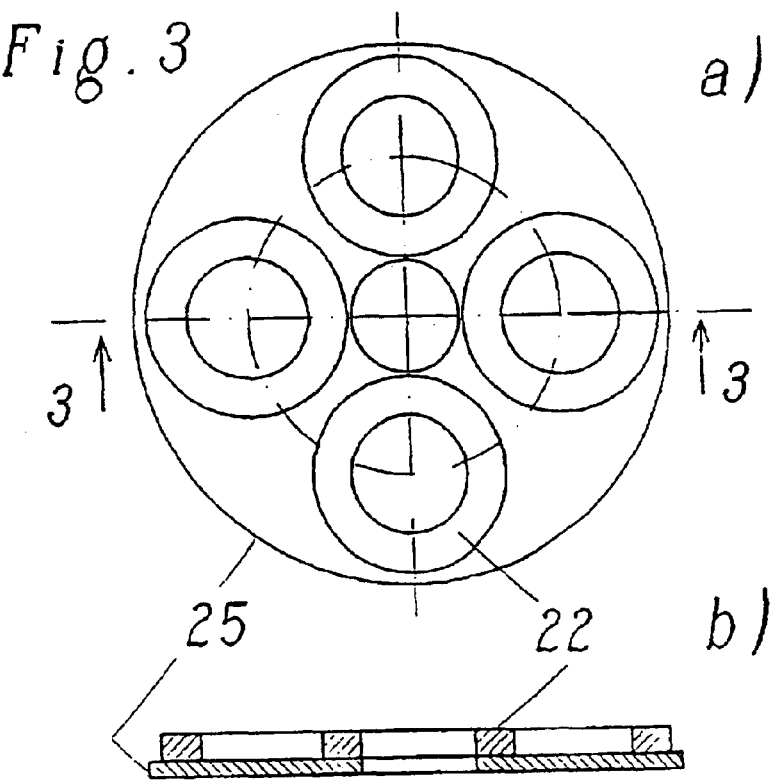

APPARATUS FOR GENERATING ELECTRICAL ENERGY

TECHNICAL FIELD

The present invention relates to an apparatus with generation of electrical energy, comprising a rotor with at least one coil, a stator with at least one magnet and at least one electrical consumer located on the rotor and connected to the at least one coil.

PRIOR ART

In apparatus with generation of electrical energy, comprising a rotor with at least one coil, a stator with at least one magnet and at least one electrical consumer, the at least one to consumer is generally located on the stator side. The electrical energy generated in the rotor is thus transmitted to the fixed part by means of sliding contacts.

Patent Abstracts of Japan Vol. 008, No. 250 (E-279), 16th Nov. 1984 (1984-11-16) and JP 59 1275566 A(Mobuo Kiyokawa) 23rd Jul. 1984 (1984-07-23) disclose an apparatus with generation of electrical energy, comprising a rotor with at least one coil, a stator with at least one magnet and at least one electrical consumer, wherein on the rotor there is located a diode bridge connected to the coil and connected to a further consumer. Where the further consumer is located and of what type it is cannot be inferred from the document.

DE 27 10 148 A (Voith Getriebe KG) 14th Sep. 1978 (1978-09-14) discloses a blade rotor designed as a wind energy converter wherein electrical lights are located on the rotor. These should form a closed advertising space for the eye when the rotor turns sufficiently rapidly. The thus designed energy converter is provided with a generator which supplies the current for the lights. For further details refer to Lueger, Lexikon der Technik, 1965, Vol. 7, pages 574–581. In this additional literature wind power plants are described where a separate generator with its own rotor is provided in each case in addition to the blade rotor. In this arrangement the current for the lights is transmitted from the generator rotor to the blade rotor.

DESCRIPTION OF THE INVENTION

The invention now proposes an apparatus of the type specified initially, wherein the at least one electrical consumer located on the rotor and there connected to the at least one coil is a light-emitting element and/or a non-luminous signal transmitter.

A particularly interesting and advantageous application of the invention is obtained if the a apparatus is designed as a windmill and the rotor is provided with blades. The invention is particularly suited for this application because, as a result of the generation of electrical energy, sliding contacts between the rotor and the stator are dispensed with on the rotor and in addition a low running and starting resistance of the rotor can be achieved which is particularly important for a windmill.

If at least one light-emitting diode (LED) is used as the consumer on the rotor, this will light up as soon as the windmill begins to be turned by the wind. In particular, this can lead to attractive effects when a plurality of differently coloured light-emitting diodes are used on the; blades of the windmill.

Advantageous and therefore preferred embodiments and further developments of the invention are characterised in the dependent claims.

BRIEF EXPLANATION OF THE DRAWINGS

The invention will be explained in detail hereinafter with reference to examples of embodiment in connection with the drawings, wherein the examples relate to an apparatus according to the invention constructed as a windmill, where

FIG. 2a) is a top view of the mounting surface of the stator provided with a corresponding number of permanent magnets and bordering on the said gap and b) is a sectional view of the magnets and an appropriate mounting plate (section 2—2 in view a));

FIG. 3a) is a top view of the mounting surface of the rotor provided with several coils and bordering on the gap between rotor and stator and b) is a sectional view of the magnets and an appropriate mounting plate (section 3—3 in view a));

WAYS OF IMPLEMENTING THE INVENTION

Figure 1:
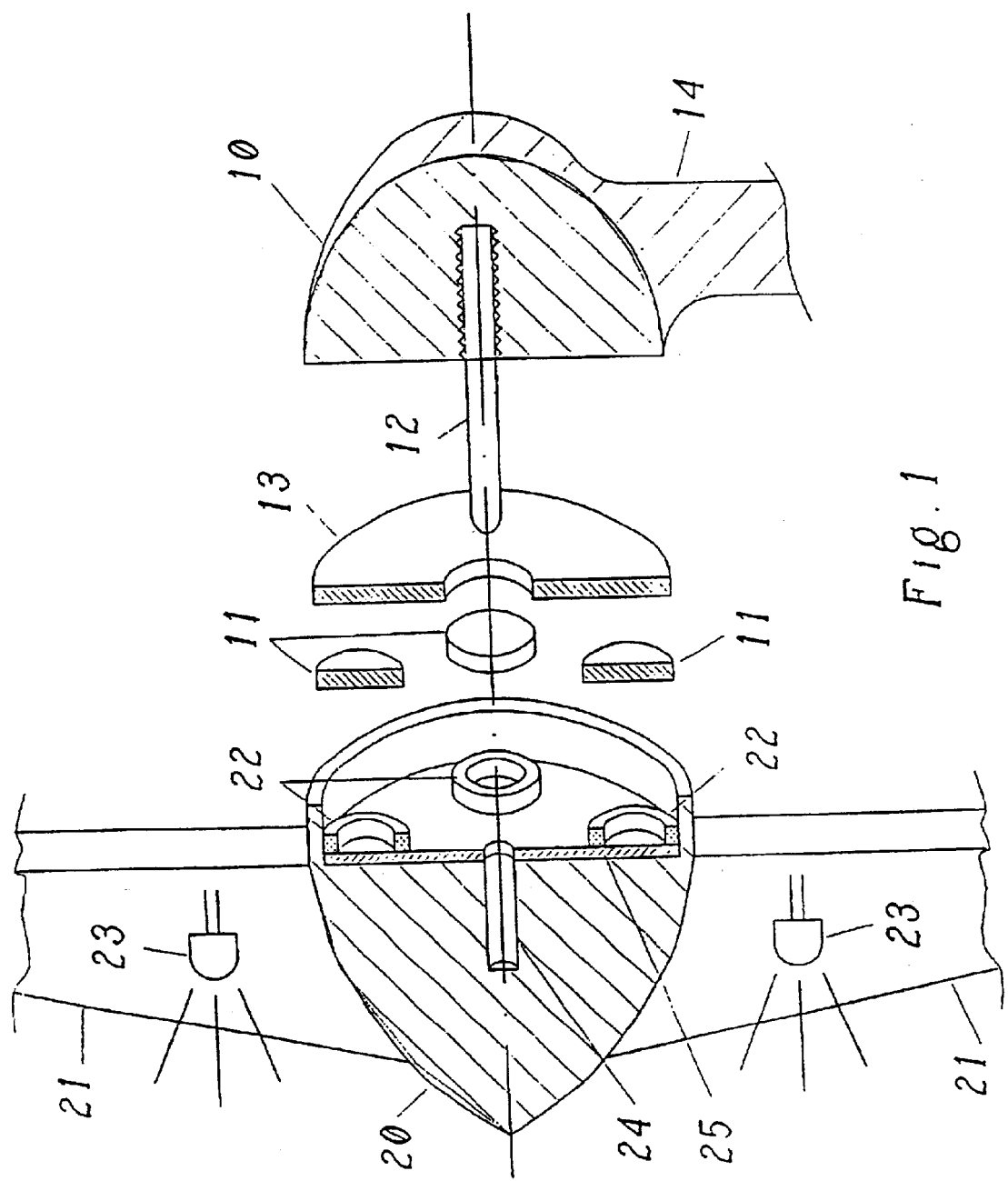
FIG. 1 is a perspective exploded view of a windmill according to the invention cut in half.

The apparatus in FIG. 1 is a windmill of a handy size such as can be installed, for example, for decorative purposes in the garden of a house, on a balcony or in a similar location.

The windmill in FIG. 1 comprises a stator 10 and a rotor 20 provided with blades 21. The stator has means 14 for its attachment to a stay-bar or similar. The parts shown between the stator 10 and the rotor 20 belong to the stator 10 and comprise four axially-magnetised permanent magnets 11 which are arranged such that they are distributed uniformly around the rotor or stator axis, as shown in FIG. 2. On the rotor 20 are provided four coils 22 corresponding to the number of permanent magnets 11, which like the permanent magnets 11 are also arranged uniformly around the rotor or stator axis and at the same distance therefrom. This is shown in FIG. 3. On the blades 21 of the rotor 20 there are located light-emitting diodes (LEDs) 23 wherein here only one such light-emitting diode is shown per blade. The light-emitting diodes 23 are electrically connected to the coils 22. The rotor 20 is supported on an axial bearing pin 12 of the stator 10, which engages in an axial bearing hole 24 in the rotor 20.

When the rotor 20 turns, for example, as a result of being driven by the wind, an alternating voltage is induced in the coils 22 of the rotor 20 as said coils move past the permanent magnets 11 of the stator 10 and are thereby exposed to an alternating magnetic field. This results in a voltage at the light-emitting diodes 23 as the electrical consumer, which makes these light up when a threshold voltage of typically 2 V–2.5 V is reached. Since this voltage or the appropriate current is generated directly in the rotor 20 on which the light-emitting diodes 23 are located as consumers, there is no need to transmit the current from the stator 10 to the rotor 20 via sliding contacts (slip rings) which would bring about an additional turning resistance for the rotor 20. The rotor 20 can thus advantageously be moved even by relatively gentle wind.

In order to avoid cogging moments and thereby further facilitate starting of the windmill at low wind strengths, the coils 22 are preferably implemented with an air-gap winding or an iron-free winding. They can be self-supporting coils e.g. so-called backlag coils.

The magnets 11 are preferably mounted on a disk of magnetic material, especially an iron disk as shown in FIG.

1 and denoted by 13. By this means the flux guidance is improved, i.e, higher magnetic flux is obtained in the coils 22.

If the magnets 11, as is preferred, all have the same polarisation relative to the direction of the axis, e.g. NNNN as shown in FIG. 2, and there are gaps between them as also shown in FIG. 2, a field having an opposite direction of flux forms between the magnets, as is indicated by SSSS in FIG. 2. Thus, with a given number of magnets it is possible to construct a generator with twice as many poles. In the case with four magnets taken as an example, a generator with eight poles is thus obtained. This is therefore advantageous because as a result of a large number of poles a sufficiently high voltage to operate the light-emitting diodes 23 can be achieved even at low speed. The voltage is namely proportional to the number of poles in addition to the speed. Additionally savings on magnets are hereby made.

If, as is further preferred, the coils 22 on the rotor 20 are also mounted on a disk made of a magnetic material, again especially iron sheet, the magnets 11 arranged on the stator exert an attractive force on the rotor 20 in the axial direction. A corresponding iron sheet is denoted by 25 in FIG. 1. As a result of said force, the rotor 20 does not need to be attached on the bearing pin 12 of the stator in the axial direction. It is sufficient to simply press it onto the bearing pin where it is then held axially by the magnetic forces. This is especially advantageous with respect to the possibility that the stator, 10 and rotor 20 can be simply joined together or separated one from the other and thus, for example can be packaged separately one from the other and dispatched. The axial attraction between stator and rotor can be adjusted precisely and simply by varying the thickness and the spacing of the disk 25.

The light-emitting diodes 23 are used simultaneously as rectifier elements and lighting elements. In this respect it is preferable to arrange two light-emitting diodes always in pairs and anti-parallel one to the other in order to utilise both half-waves of the alternating voltage.

As already mentioned, the voltage induced in the coils 22 of the rotor 20 is proportional to the rotor speed. In order to ensure,: on the one hand, that the light-emitting diodes light up even in only gentle wind and at only a low rotor speed but, on the other hand, to avoid the current being too high above the failure limit of the light-emitting diodes in very strong wind and at correspondingly high speed, voltage stabilisation can be used.

In order to avoid voltage stabilisation, the dimensions can be selected so that the current through the light-emitting diodes themselves does not exceed the maximum permissible value even at the highest predicted speed.

Figure 4:
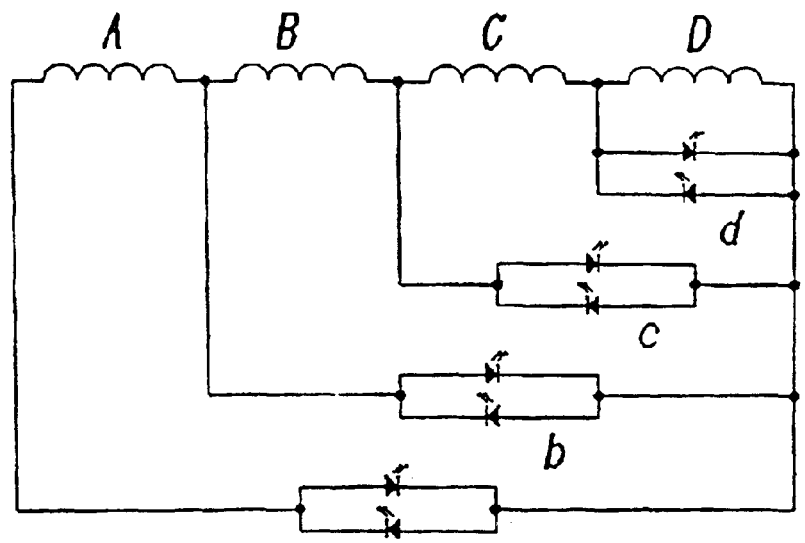
FIG. 4 is a preferred wiring of the rotor coil with several light-emitting diodes.

FIG. 4 shows an arrangement with four pairs of light-emitting diodes a–d connected anti-parallel to one another for which voltage stabilisation is also not required. In this arrangement four coils A, B, C and C are connected in series in this order. Only the pair of diodes d is connected in parallel with the coil D. The pair c is in parallel with the two coils C and D. The: pair b is in parallel with the three coils B–D and finally the pair a is allocated to all four coils A–D.

The arrangement in FIG. 4 has the advantage that as the speed increases, the current is distributed to increasingly mart pairs of diodes and is thereby somewhat stabilised. Thus, initially only the pair of diodes a which sees the voltage from all four coils A–D begins to light up. As the speed increases, the other pairs of diodes b, c and d are then added one after the other The current through the individual light-emitting diodes thus remains substantially constant over a wide operating range.

The arrangement in FIG. 4 also has the advantage that as a result of the dependence of the number of burning light-emitting diodes on the speed, on the one hand an interesting optical effect is obtained and on the other hand, the speed of the windmill can be identified and read off by the observer which allows conclusions to be drawn on the force of the wind driving the windmill.

Figure 5:
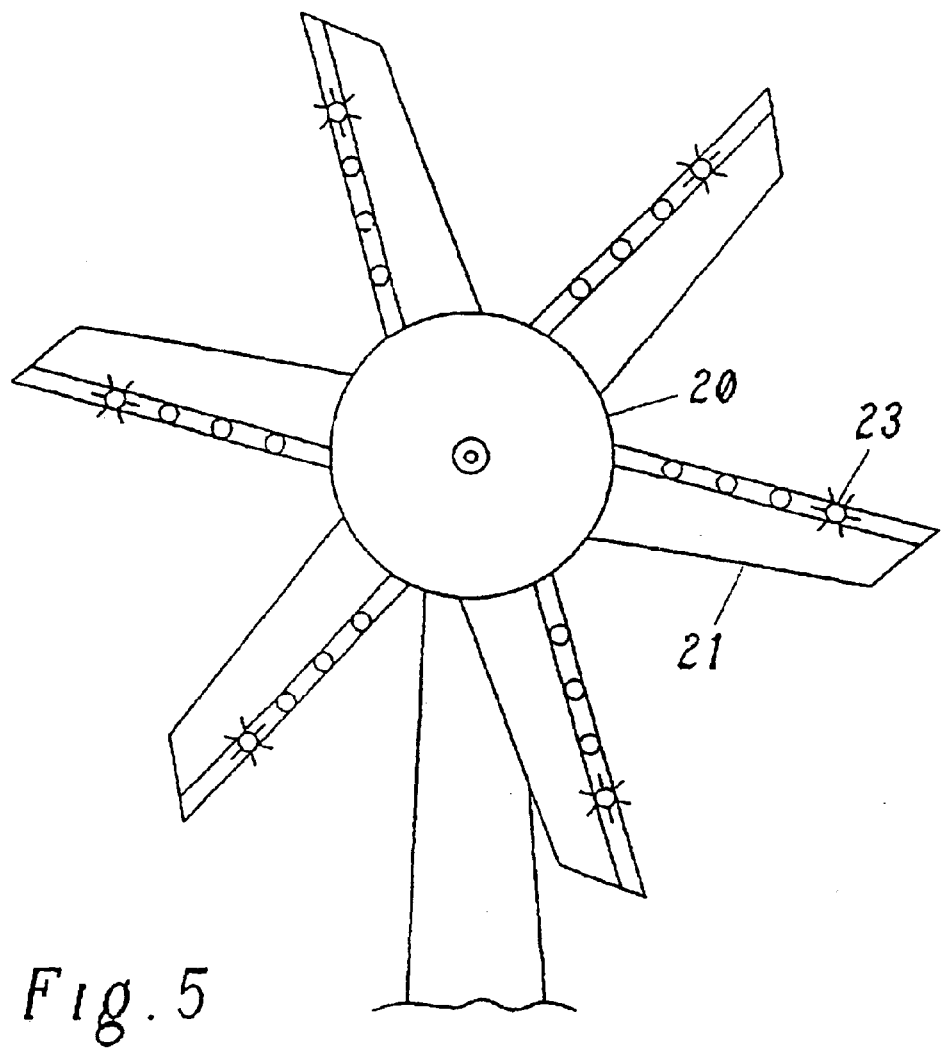
FIG. 5 is a schematic view of the rotor of the windmill with a plurality of light-emitting diodes.

FIG. 5 shows a possible design of the rotor 20 in a front view wherein respectively several light-emitting diodes 23 are arranged radially spaced on the blades 21 of the rotor. These could, for example, also be differently coloured. If the light-emitting diodes are also wired as in FIG. 4, they could be arranged for example such that as the speed increases, they begin to light up from the inside to the outside or conversely.

The design of the apparatus according to the invention described above as an illuminated windmill is only an example. Other realisations are fundamentally also feasible. Another very interesting possibility is, for example, a corresponding illumination of vehicle wheels, especially bicycles, motorcycles, prams, inline-skates or similar, wherein the illumination then also has a safety aspect. The number and size of the coils and magnets is within certain limits arbitrary. Especially, FIG. 4 can be extended to further coils and consumers. The coils and the magnets can have different shapes and sizes. Especially suitable for the magnets are flat or disk shapes with rectangular or round cross-sections. On account of their strength, neodymium magnets are particularly advantageous. In addition to light-emitting diodes, other light-emitting elements such as incandescent lamps, halogen lamps or light-emitting polymers can also be considered as consumers. Non-luminous signal transmitters, e.g. those of an acoustic nature could fundamentally also be used. Here it can be envisaged that a melody or similar is produced during a revolution.

What is claimed is:

1. An apparatus with generation of electrical energy, comprising:
   a rotor with at least one coil;
   a stator with at least one magnet and at least one electrical consumer located on the rotor and connected to the at least one coil,
   wherein the at least one consumer includes at least one of a light-emitting element and a nonluminous signal transmitter, and
   wherein the light-emitting element includes at least two light-emitting diodes connected in series to one another.

2. The apparatus according to claim 1, wherein it is designed as a windmill and the rotor is provided with blades.

3. An apparatus with generation of electrical energy, comprising:
   a rotor with at least one coil;
   a stator with at least one magnet and at least one electrical consumer located on the rotor and connected to the at least one coil, wherein the at least one consumer includes at least one of a light-emitting element and a nonluminous signal transmitter, and wherein several series-connected coils distributed uniformly over the circumference of the rotor are provided and that several consumers constructed as light-emitting diodes are connected to these coils such that a first of the consumers sees a voltage generated in series in at least two of the coils and a second consumer sees a voltage generated in series in at least one coil fewer.

4. The apparatus according to one of claims 1–2, wherein the at least one magnet is a permanent magnet.

5. The apparatus according to claim 4, wherein the at least one permanent magnet is mounted on a disk comprising magnetic material.

6. The apparatus according to claim 5, wherein several magnets are distributed uniformly around a circumference of the stator with respect to its axis and are preferably arranged with matching polarity (NNNN) relative to this axis.

7. The apparatus according to one of claims 1–2, wherein the at least one coil has an air gap winding or an iron-free winding.

8. The apparatus according to claim 7, wherein the at least one coil is mounted on a disk made from a magnetic material.

9. The apparatus according to claims 1–2, wherein the rotor is supported on a pin (12) of the stator.

* * * * *